(12) United States Patent
Grayson

(10) Patent No.: US 9,723,127 B1
(45) Date of Patent: Aug. 1, 2017

(54) EMOTICON SCRIPTURE SYSTEM

(71) Applicant: Detrice Grayson, Symrna, GA (US)

(72) Inventor: Detrice Grayson, Symrna, GA (US)

(*) Notice: Subject to any disclaimer, the term of this patent is extended or adjusted under 35 U.S.C. 154(b) by 0 days.

(21) Appl. No.: 15/207,776

(22) Filed: Jul. 12, 2016

(51) Int. Cl.
*H04M 3/42* (2006.01)
*H04M 1/725* (2006.01)
*H04W 4/00* (2009.01)
*H04W 4/12* (2009.01)
*G06F 3/0483* (2013.01)

(52) U.S. Cl.
CPC ...... *H04M 1/72555* (2013.01); *G06F 3/0483* (2013.01); *H04W 4/003* (2013.01); *H04W 4/12* (2013.01); *H04M 2250/56* (2013.01)

(58) Field of Classification Search
CPC ............ G06F 3/04883; G06F 3/04886; G06F 3/0488; G06F 17/2765; H04W 88/02; H04W 4/02; H04L 67/42; H04L 63/102; H04L 63/104; H04M 1/72583; H04M 1/72519; H04M 1/72569; H04M 1/72522; H04M 2250/22

USPC ........ 455/556.1, 414.1, 566, 575.1; 715/810, 715/256, 863, 207; 709/203, 206; 345/173, 156, 168, 174
See application file for complete search history.

(56) References Cited

U.S. PATENT DOCUMENTS

| 2005/0233775 A1* | 10/2005 | Chang | H04M 1/72522 455/567 |
| 2011/0113318 A1* | 5/2011 | Hirosawa | G06F 17/2735 715/207 |
| 2013/0159919 A1* | 6/2013 | Leydon | G06F 3/0236 715/780 |

* cited by examiner

*Primary Examiner* — Fred Casca
(74) *Attorney, Agent, or Firm* — The Law Office of Jerry D. Haynes

(57) ABSTRACT

A system for the delivery of scriptures that includes: a plurality of images stored in a database; at least one scripture associated with each image, wherein said scriptures are stored in the database; a software application, where the software application includes instructions on syncing and linking an image within the plurality of images to a scripture; and a portable electronic device, where the portable electronic device stores the software application and is adapted to provide access to the plurality of images and associated scriptures. The portable electronic device may be a smartphone or a tablet. The plurality of images preferably includes emoticons.

1 Claim, 1 Drawing Sheet

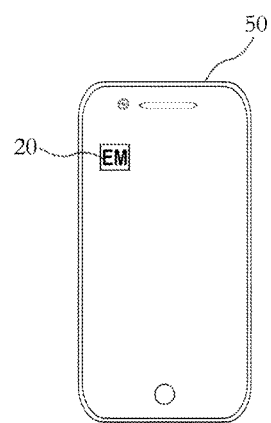

EMOTICON SCRIPTURE SYSTEM

BACKGROUND OF THE INVENTION

Field of Invention

The present invention relates to an application that syncs or matches religious scriptures to an emoticon.

Description of Related Art

Many religions encourage followers to have daily scriptures in order to strengthen their faith and for spiritual encouragement. Daily scriptures are commonly used in all types of religions including Christianity, Islam, Judaism and Buddhism. Further technology has allowed smartphones to have been integrated to most individuals' lives in one form or the other. Smartphones are used principally for communication between two parties however due to the interactive applications available on the smartphone a user may have various software applications to interact with on a daily basis. Smartphone applications provide news, entertainment, music and other features as desired. Presently there are thousands of software applications for interaction on a smartphone. The present invention integrates a software application that provides daily scripture synced with various emoticons that may be associated with scripture.

SUMMARY OF THE INVENTION

The present invention relates to a system for the delivery of scriptures that includes: a plurality of images stored in a database; at least one scripture associated with each image, wherein said scriptures are stored in the database; a software application, where the software application includes instructions on syncing and linking an image within the plurality of images to a scripture; and a portable electronic device, where the portable electronic device stores the software application and is adapted to provide access to the plurality of images and associated scriptures.

BRIEF DESCRIPTION OF DRAWINGS

FIG. 1 depicts an implementation of a software application onto a smartphone in accordance with the present invention.

DETAILED DESCRIPTION

The present invention relates to a smartphone software application that links a series of emoticons with Biblical scriptures as a means of devotional interaction for a user. The software application links these emoticons with a daily scripture reading therefore helps to reinforce a user's faith. The messages are linked to visual images viewed on a user's smartphone. A user may activate or highlight a particular emoticon and then a Biblical scripture may be provided through the application. The present invention creates a more effective means of understanding and relating to the scripture provided. The images may be humorous in some applications and therefore provide innovated means to share Biblical scriptures on a daily basis.

FIG. 1 depicts the implementation of this software application onto a Smartphone 50. Icon 20 is shown on the Smartphone 50 in FIG. 1. A user engages the software application by activating the Icon 20 and therefore will be provided with a series of images linked to Biblical scriptures. A database may be created to storing a plurality of images available in accordance with the present invention. The database also stores a plurality of scriptures available for linkage to a particular image. The scriptures may be Biblical, Koranic or Hebrew as selected for use by a user. This particular software application therefore provides an entertaining and effective means for sharing Biblical scriptures. The instant invention has been shown and described in what it considers to be the most practical and preferred embodiments. It is recognized, however, that departures may be made there from within the scope of the invention and that obvious modifications will occur to a person skilled in the art.

What is claimed is:

1. A system for the delivery of scriptures comprising:
   a. a plurality of images stored in a database, where the plurality of images includes emoticons;
   b. at least one scripture associated with each image, wherein said scriptures are stored in the database;
   c. a software application, where the software application includes instructions on syncing and linking an image within the plurality of images to a scripture; and
   d. a portable electronic device, where the portable electronic device stores the software application and is adapted to provide access to the plurality of images and associated scriptures, wherein a user activates an image and in response to the activation of the image a scripture associated with the image is displayed on the portable electronic device;

wherein the scripture is one of a Biblical, Koranic or Hebrew as selected for use by a user; and wherein the portable electronic device is a smartphone or a tablet.

* * * * *